United States Patent
Mizuno et al.

(10) Patent No.: US 10,347,126 B2
(45) Date of Patent: Jul. 9, 2019

(54) DRIVING ASSISTANCE DEVICE

(71) Applicant: AISIN SEIKI KABUSHIKI KAISHA, Kariya-shi, Aichi (JP)

(72) Inventors: Yuta Mizuno, Kasugai (JP); Shunsuke Kogure, Kariya (JP); Wataru Nogimori, Inazawa (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 15/746,631

(22) PCT Filed: Jun. 10, 2016

(86) PCT No.: PCT/JP2016/067381
§ 371 (c)(1),
(2) Date: Jan. 22, 2018

(87) PCT Pub. No.: WO2017/018073
PCT Pub. Date: Feb. 2, 2017

(65) Prior Publication Data
US 2018/0211535 A1      Jul. 26, 2018

(30) Foreign Application Priority Data
Jul. 30, 2015 (JP) .................................. 2015-151236

(51) Int. Cl.
*G08G 1/16* (2006.01)
*G06K 9/00* (2006.01)
(Continued)

(52) U.S. Cl.
CPC .......... *G08G 1/16* (2013.01); *B60W 30/18145* (2013.01); *B60W 30/18154* (2013.01);
(Continued)

(58) Field of Classification Search
CPC .......... G08G 1/16; G08G 1/166; G08G 1/168; B60W 30/18145; B60W 30/18154;
(Continued)

(56) References Cited

U.S. PATENT DOCUMENTS

2014/0297059 A1* 10/2014 Mizutani ................. G08G 1/16
                                                                  701/1

FOREIGN PATENT DOCUMENTS

JP       04-332100 A      11/1992
JP     2002-083400 A       3/2002
(Continued)

OTHER PUBLICATIONS

Tsuyoshi Moriyama, et al., "Automated Individualization of Eye Region Model using Active Appearance Model Search", Image Recognition and Understanding Symposium (MIRU2006), Jul. 2006, pp. 830-835.
(Continued)

*Primary Examiner* — Leon Flores
(74) *Attorney, Agent, or Firm* — Sughrue Mion, PLLC

(57) ABSTRACT

A driving assistance device of one embodiment includes an acquirer that acquires first environmental information representing an environment of a traveling point of a vehicle after elapse of a given length of time from a current traveling point of the vehicle, a check information storage that stores second environmental information representing an environment of a point at which the vehicle has traveled and check action information representing a driver's necessary action under the environment indicated by the second environmental information, in association with each other, an action information storage that stores third environmental information and actual action information representing an actual action of the driver under the environment indicated by the third environmental information, in association with each
(Continued)

other, a comparer that compares the check action information, which is associated with the second environmental information of the environment indicated by the first environmental information in the check information storage, with the actual action information, which is associated with the third environmental information of the environment indicated by the first environmental information in the action information storage, and a notifier that issues a notification on the basis of a result of the comparison by the comparer.

5 Claims, 11 Drawing Sheets

(51) Int. Cl.
*B60W 50/00* (2006.01)
*B60W 50/14* (2012.01)
*B60W 30/18* (2012.01)
*G06K 9/62* (2006.01)

(52) U.S. Cl.
CPC ........ *B60W 50/0097* (2013.01); *B60W 50/14* (2013.01); *G06K 9/00201* (2013.01); *G06K 9/00268* (2013.01); *G06K 9/00281* (2013.01); *G06K 9/00845* (2013.01); *G08G 1/166* (2013.01); *G08G 1/168* (2013.01); *B60W 2050/146* (2013.01); *B60W 2550/00* (2013.01); *B60W 2550/402* (2013.01); *G06K 9/00805* (2013.01); *G06K 9/00818* (2013.01); *G06K 9/6247* (2013.01)

(58) Field of Classification Search
CPC .............. B60W 50/0097; B60W 50/14; G06G 9/00201; G06G 9/00268; G06G 9/00281; G06G 9/00845
See application file for complete search history.

(56) References Cited

FOREIGN PATENT DOCUMENTS

| | | | |
|---|---|---|---|
| JP | 2004-347464 | A | 12/2004 |
| JP | 2008-262388 | A | 10/2008 |
| JP | 2009-123182 | A | 6/2009 |

OTHER PUBLICATIONS

International Search Report for PCT/JP2016/067381 dated Aug. 16, 2016 [PCT/ISA/210].

\* cited by examiner

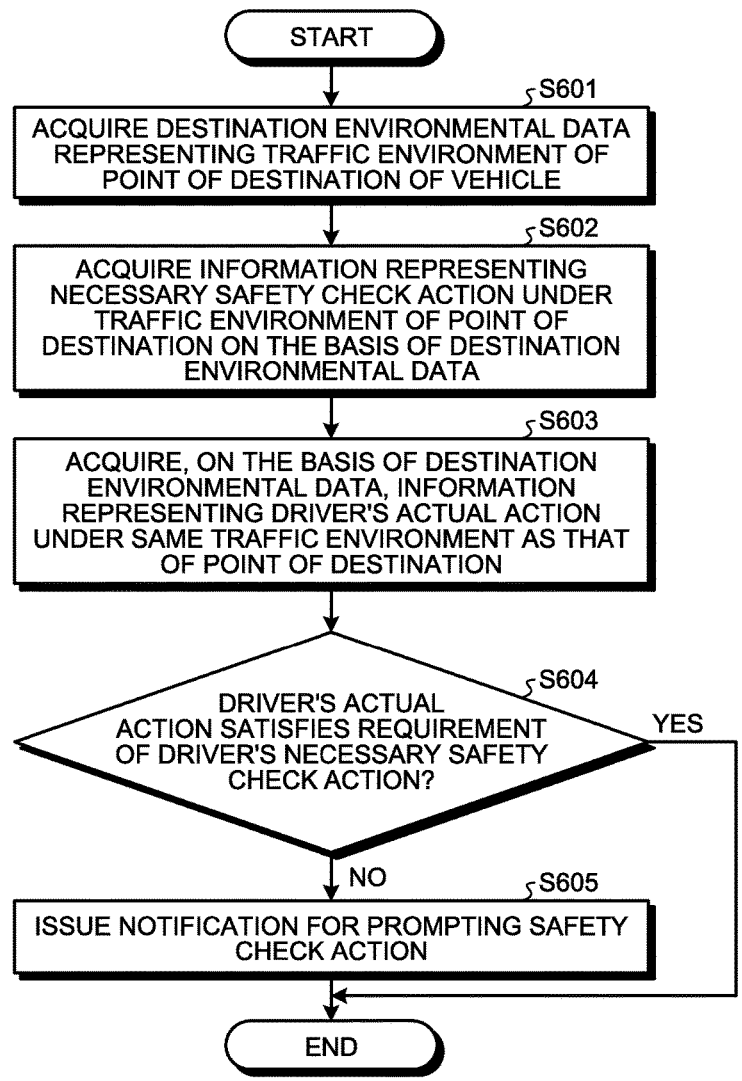

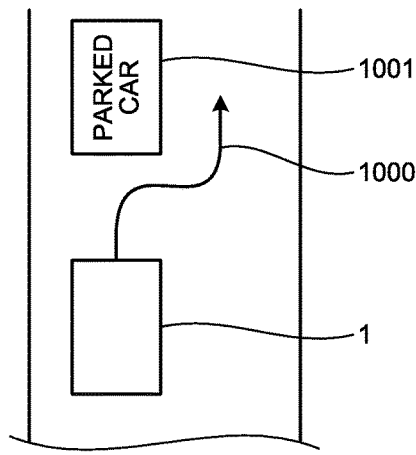
FIG. 10 (A)
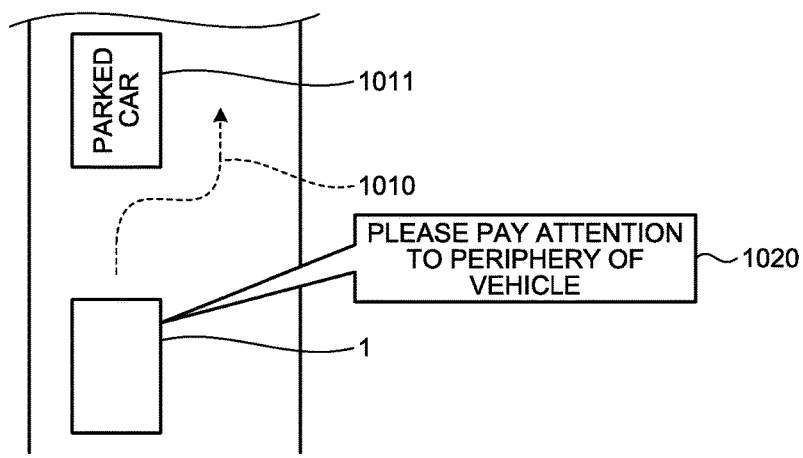
FIG. 10 (B)

DRIVING ASSISTANCE DEVICE

CROSS REFERENCE TO RELATED APPLICATIONS

This application is national stage application of International Application No. PCT/JP2016/067381, filed Jun. 10, 2016, which designates the United States, incorporated herein by reference, and which claims the benefit of priority from Japanese Patent Application No. 2015-151236, filed Jul. 30, 2015, the entire contents of which are incorporated herein by reference.

TECHNICAL FIELD

Embodiments of the present invention relate generally to a driving assistance device.

BACKGROUND ART

Conventionally, there have been proposed techniques for detecting the orientation of the face of a driver of a vehicle in order to issue an alarm to the driver when the driver is distracted.

CITATION LIST

Patent Literature

Patent Document 1: Japanese Laid-open Patent Application Publication No. 2004-347464
Patent Document 2: Japanese Laid-open Patent Application Publication No. 2002-083400
Patent Document 3: Japanese Laid-open Patent Application Publication No. 04-332100

SUMMARY OF INVENTION

Problem to be Solved by the Invention

Under a certain traffic environment, however, such a conventional technique alerts the driver upon detecting a driver's inattentive driving unsuitable for the certain traffic environment, which may almost place the driver in imminent danger at the time of being alerted. Thus, in terms of alerting drivers, preferably, the earlier, the better.

Means for Solving Problem

A driving assistance device according to one embodiment includes an acquirer that acquires first environmental information representing an environment of a traveling point of a vehicle after elapse of a given length of time from a current traveling point of the vehicle; a check information storage that stores second environmental information and check action information in association with each other, the second environmental information representing an environment of a point at which the vehicle has traveled, the check action information representing a necessary action of a driver under the environment indicated by the second environmental information; an action information storage that stores third environmental information and actual action information in association with each other, the actual action information representing an actual action of the driver conducted under the environment indicated by the third environmental information; a comparer that compares the check action information, which is associated with the second environmental information of the environment indicated by the first environmental information in the check information storage, with the actual action information, which is associated with the third environmental information of the environment indicated by the first environmental information in the action information storage; and a notifier that issues a notification on the basis of a result of the comparison by the comparer before the vehicle travels in the environment indicated by the first environmental information. By the above configuration, the driver can conduct a safety check beforehand, whereby safety improvement can be achieved.

The driving assistance device according to the embodiment further includes an action acquirer that acquires action information representing an action of the driver of the vehicle, and an updater that updates the action information storage with the third environmental information and the action information in association with each other, the action information acquired by the acquirer as an action of the driver when the vehicle travels in the environment indicated by the third environmental information. By the above configuration, the action information storage contains driver's actual actions, which enables issuance of a more appropriate notification, resulting in safety improvement.

In the driving assistance device of the embodiment, the acquirer acquires the first environmental information from a vehicle guidance device that derives a route of the vehicle to a destination on the basis of map information. The above configuration enables an advance safety check for the destination of the vehicle, attaining safety improvement.

The driving assistance device of the embodiment further includes a driving-status storage that stores the third environmental information and driving-status information in association with each other, the driving-status information representing a driving state of the driver when traveling under an environment of a point indicated by the third environmental information, wherein the acquirer acquires the first environmental information as an estimated traveling direction of the vehicle on the basis of the third environmental information which is associated with the driving-status information representing a current driving state of the driver in the driving-status storage.

The above configuration enables an advance safety check for the destination of the vehicle, attaining safety improvement.

In the driving assistance device of the embodiment, the comparer determines whether or not a size of a visual field of the driver, indicated by the actual action information as an actual action of the driver, is larger than a size of a visual field, indicated by the check action information, in which the driver needs to conduct a check. The notifier issues a notification when being determined that the size of the visual field of the driver indicated by the actual action information is not larger than the size of the visual field, indicated by the check action information, in which the driver needs to conduct a check. By the above configuration, the notification can be issued on the basis of a driver's actual action, enabling safety improvement.

BRIEF DESCRIPTION OF DRAWINGS

FIG. 5 illustrates a table structure of an action history database of the first embodiment, by way of example;

FIG. 6 is a flowchart showing steps of a message notifying process of the driving assistance system of the first embodiment;

FIGS. 10(A) and 10(B) illustrate a concept of notification for alert when distance meters of the vehicle of the first embodiment detect a parked car, by way of example;

DESCRIPTION OF EMBODIMENTS

First Embodiment

Hereinafter, an example of a driving assistance device mounted on a vehicle 1 according to a first embodiment will be described.

In the present embodiment the vehicle 1 may be, for example, an automobile (internal-combustion automobile) including an internal combustion (engine, not illustrated) as a power source, an automobile (electric automobile or fuel-cell automobile) including an electric motor (not illustrated) as a power source, or an automobile (hybrid automobile) including both of them as a power source. The vehicle 1 can incorporate a variety of transmissions and a variety of devices (systems, parts or components) necessary for driving the internal combustion or the electric motor. Types, numbers, and layout of devices involving in driving wheels 3 of the vehicle 1 can be variously set.

Figure 1:
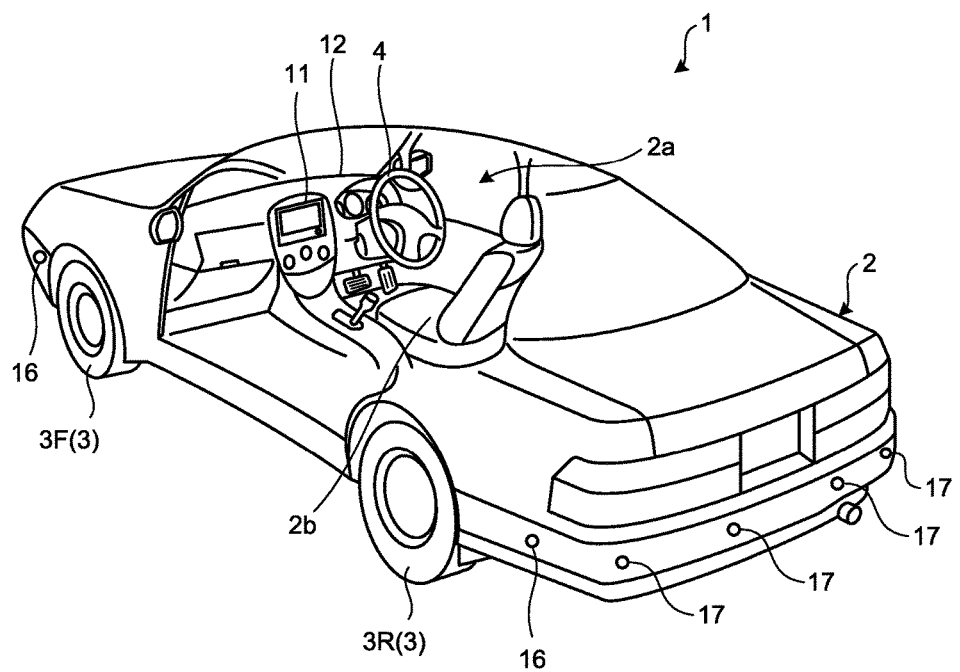
FIG. 1 is a partially transparent, perspective view of the interior of a vehicle according to a first embodiment.

As illustrated in FIG. 1, the vehicle 1 includes a body 2 defining an interior 2a in which a driver (not illustrated) rides. A steering 4 is provided in the vehicle interior 2a, facing a driver or an occupant at a seat 2b. In the present embodiment the steering 4 is a steering wheel protruding from a dashboard (instrument panel) 12 by way of example.

As illustrated in FIG. 1, in the present embodiment the vehicle 1 is a four-wheel vehicle (four-wheel automobile) including two right and left front wheels 3F and two right and left rear wheels 3R, as one example. In the present embodiment the four wheels 3 can be all steered (steerable).

The vehicle interior 2a is equipped with a car navigation device 11 in the center of the dashboard 12 in vehicle width direction or horizontal direction. The car navigation device 11 includes a display device and an audio output device. The display device is exemplified by a liquid crystal display (LCD) or an organic electroluminescent display (OELD), for example. The audio output device is a speaker, for example. The display device is covered by a transparent operation input such as a touch panel. The occupant can view images displayed on the screen of the display device through the operation input. The occupant can also touch, press, and move the operation input with his or her finger or fingers at positions corresponding to the images displayed on the screen of the display device for executing operational inputs.

As illustrated in FIG. 1, the vehicle body 2 includes multiple distance meters 16 and multiple distance meters 17. The distance meters 17 of the present embodiment are disposed on the rear face and the front face of the vehicle body 2. The distance meters 16 of the present embodiment are disposed on the right-side face and the left-side face of the vehicle body 2. The distance meters 16, 17 are, for example, sonars that emit ultrasonic waves and detect reflected waves thereof. The sonars may be referred to as sonar sensors or ultrasonic detectors. According to the present embodiment, presence or absence of an object as an obstacle around the vehicle 1 can be found and a distance to the object can be measured from results of the detection by the distance meters 16, 17.

Figure 2:
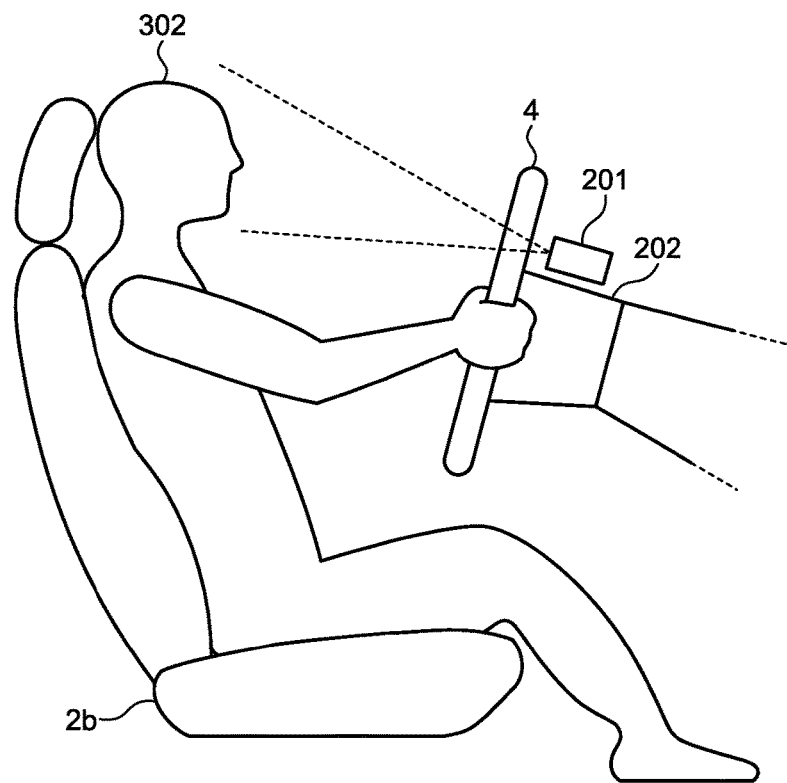
FIG. 2 illustrates an exemplary placement of an imaging device of the first embodiment.

As illustrated in FIG. 2, an imaging device 201 is installed on a steering column 202. The imaging device 201 is exemplified by a charge coupled device (CCD) camera. The imaging device 201 is adjusted in viewing angle and posture to capture the face of a driver 302 at the seat 2b in the center of field of view. The imaging device 201 images the face of the driver 302 sequentially to output image data of the captured images sequentially.

Figure 3:
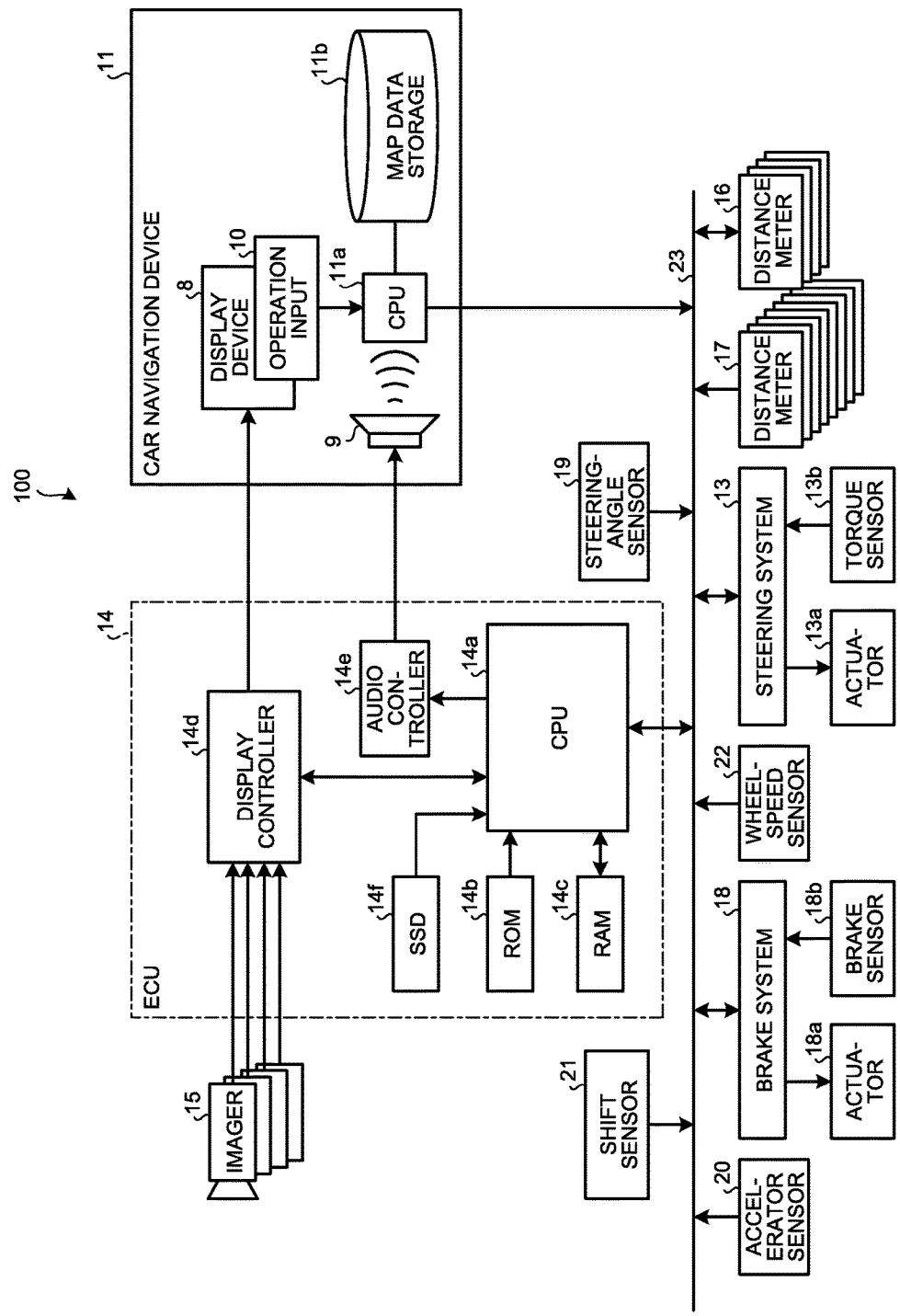
FIG. 3 is a block diagram of an exemplary configuration of a driving assistance system of the first embodiment.

Now, a driving assistance system including the driving assistance device in the vehicle 1 according to the present embodiment is described. FIG. 3 is a block diagram of an exemplary configuration of a driving assistance system 100 of the present embodiment. As exemplified in FIG. 3, the driving assistance system 100 includes an ECU 14, the car navigation device 11, a steering system 13, the distance meters 16, 17, a brake system 18, a steering-angle sensor 19, an accelerator sensor 20, a shift sensor 21, and a wheel-speed sensor 22 which are electrically connected through an in-vehicle network 23 as an electric communication line. The in-vehicle network 23 is, for example, a controller area network (CAN). The ECU 14 can control the steering system 13 including an actuator 13a and the brake system 18 including an actuator 18a by transmitting control signals thereto via the in-vehicle network 23. The ECU 14 can also receive, via the in-vehicle network 23, results of the detection from a torque sensor 13b, a brake sensor 18b, the steering-angle sensor 19, the distance meters 16, the distance meters 17, the accelerator sensor 20, the shift sensor 21, and the wheel-speed sensor 22 as well as operation signals from the operation input. Herein, the ECU 14 is an example of the driving assistance device.

The car navigation device 11 (vehicle guidance device) includes a CPU 11a and a map data storage 11b in addition to the display device 8, the audio output device 9, and the operation input 10. Upon receiving input of a final destination through the operation input 10, the CPU 11a executes a car navigation program (not illustrated) to be able to derive route data to the final destination, referring to map data stored in the map data storage 11b.

The car navigation device 11 can display the derived route data on the display device 8. The car navigation device 11 can provide route guidance for the vehicle 1 by audio output from the audio output device 9, in accordance with the derived route data. The car navigation device 11 can output the derived route data to other elements including the ECU 14 inside the vehicle 1. According to the route data, the car navigation device 11 can also output destination environmental data representing a traffic environment from a current traveling point of the vehicle 1 to a point of destination.

The destination environmental data refers to data including the ambient environment of a current traveling point to a point of destination and the condition of the vehicle 1 when traveling over the two points, following the route data. With reference to the destination environmental data, the driver can know the situation that the vehicle 1 will turn right at an intersection ahead, for example.

The ECU 14 includes a central processing unit (CPU) 14*a*, a read only memory (ROM) 14*b*, a random access memory (RAM) 14*c*, a display controller 14*d*, an audio controller 14*e*, and a solid state drive (SSD, flash memory) 14*f*, for example. The CPU 14*a* controls the vehicle 1 as a whole. The CPU 14*a* can read a program installed and stored in a non-volatile storage device such as the ROM 14*b* to implement computation according to the program. The RAM 14*c* temporarily stores different kinds of data used in the computation of the CPU 14*a*. Of the computations by the ECU 14, the display controller 14*d* mainly performs image processing to the image data obtained by imagers 15 and image data composition for display on the display device 8. Among the computations by the ECU 14, the audio controller 14*e* mainly processes audio data to output from the audio output device 9. The SSD 14*f* is a rewritable, non-volatile memory and can store data even during power-off of the ECU 14. The CPU 14*a*, the ROM 14*b*, and the RAM 14*c* may be integrated in a single package. The ECU 14 may include another arithmetic logic processor or logic circuit such as a digital signal processor (DSP) in place of the CPU 14*a*. The ECU 14 may also include a hard disk drive (HDD) in place of the SSD 14*f*, or the SSD 14*f* or HDD can be provided separately from the ECU 14.

The configurations, arrangements, and electric connections of the various sensors and actuators as above are merely exemplary, and can be set (altered) variously.

Figure 4:
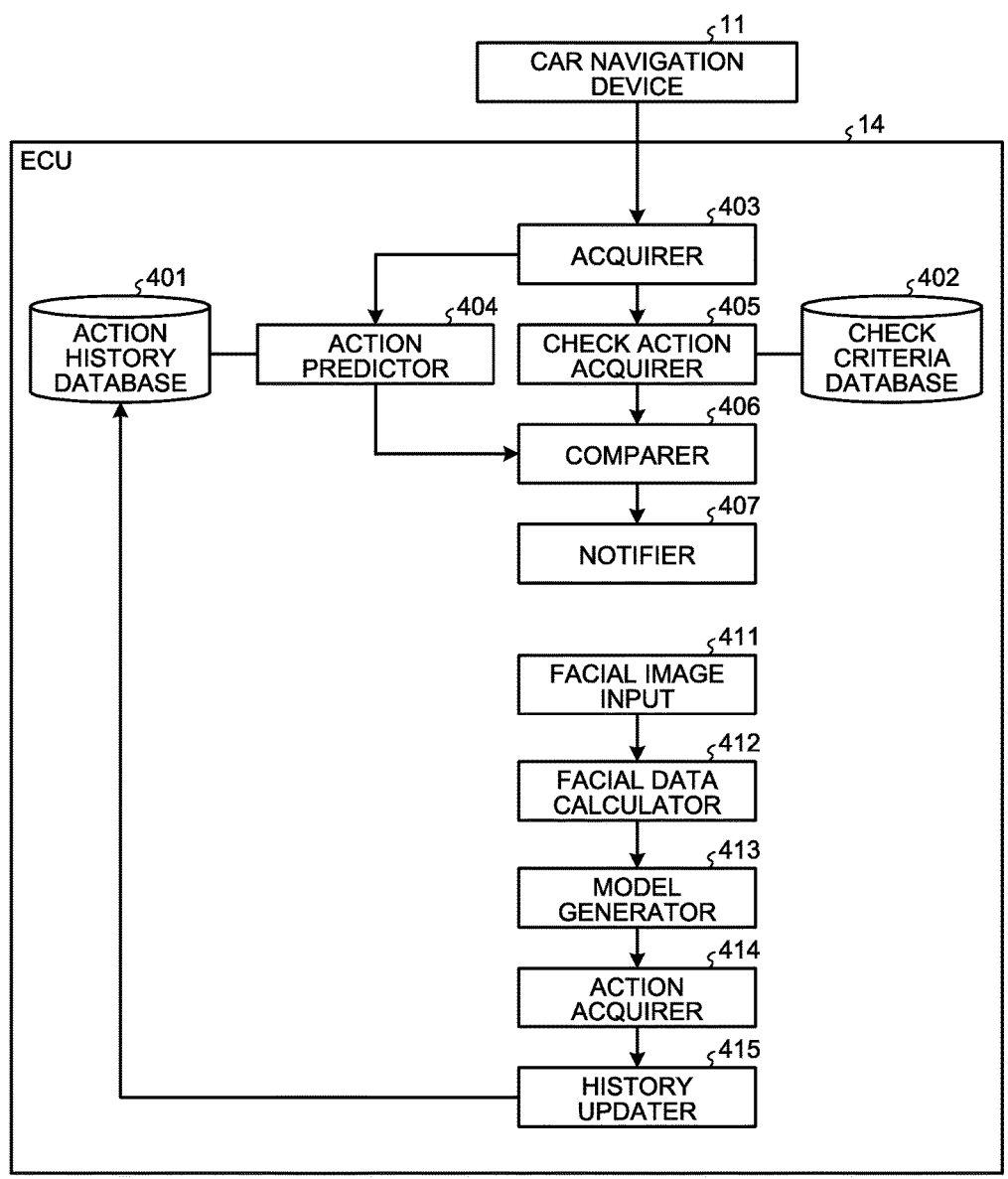
FIG. 4 is a block diagram of a functional configuration of an ECU of the first embodiment.

FIG. 4 is a block diagram of a functional configuration of the ECU 14 of the present embodiment. As illustrated in FIG. 4, the ECU 14 includes an action history database 401 and a check criteria database 402 in the ROM 14*b*. Further, the ECU 14 implements an acquirer 403, an action predictor 404, a check action acquirer 405, a comparer 406, a notifier 407, a facial image input 411, a facial data calculator 412, a model generator 413, an action acquirer 414, and a history updater 415 by executing a driving assistance program (not illustrated). The present embodiment may implement these elements by hardware instead of executing the driving assistance program (not illustrated).

The action history database 401 stores traffic environmental data of each point on the route that the vehicle 1 has traveled (i.e., corresponding to third environmental information) and information on a driver's actual action under the traffic environment (i.e., corresponding to actual action information), in association with each other. In the present embodiment, the information on the driver's actual action includes frequency of line-of-sight movement and facial moving range.

The traffic environmental data is defined as data containing the ambient environment of a certain point and the condition of the vehicle 1 traveling at the point. Thus, the traffic environmental data contains data representing an intersection and data indicating that the vehicle 1 has turned right at the intersection, for instance. The traffic environmental data may include obstacles on the road and presence or absence of road signs as the data representing the ambient environment.

FIG. 5 illustrates an exemplary table structure of the action history database 401 in the present embodiment. As illustrated in FIG. 5, the action history database 401 of the present embodiment stores the traffic environmental data, the frequency of line-of-sight movement, and the facial moving range in association with one another.

The frequency of line-of-sight movement contains the number of movements of the driver's line-of-sight under each of the stored traffic environments. For instance, the frequency of line-of-sight movement contains five times. Thereby, it is possible to know that the driver has looked around about five times at the time of turning right at the intersection.

The facial moving range contains facial orientation data and direction of line of sight. The facial orientation data represents the orientation of the driver's face, and contains information representing X, Y, and Z-axial positions and information representing rotations around X-axis, Y-axis, and Z-axis in the present embodiment. The direction of line of sight contains information on the direction of the driver's line of sight. Thus, the facial moving range includes a size of the visual field in which the driver has looked around.

The check criteria database 402 stores, when a normative driver of a driving school drives a vehicle, for example, traffic environmental data of a point where the vehicle has traveled (i.e., corresponding to second environmental information) and information on a safety check action of the normative driver under the traffic environment (i.e., corresponding to check action information), in association with each other. Although the present embodiment describes the normative driver of a driving school by way of example, the driver can be any driver as long as he or she has conducted a driving operation to become a criterion of safety check action.

In the present embodiment, the information on necessary safety check actions of the driver in the traffic environment concerned contains the frequency of line-of-sight movement and the facial moving range by way of example. However, the present embodiment is not intended to limit the information to the frequency of line-of-sight movement and the facial moving range. The information may be arbitrary information as long as it concerns a driver's action under the traffic environment. Further, the present embodiment describes an example of specifying a size of the visual field in which the driver has conducted a safety check from the facial moving range. However, the size of the visual field in which the driver has conducted a safety check can be derived by another method.

Thus, the check criteria database 402 contains the criteria of necessary safety checks of the driver under each traffic environment, such as the number of surrounding checks and the size of the visual field in which the driver needs to check. The table structure of the check criteria database 402 may be similar to that of the action history database 401.

The acquirer 403 acquires destination environmental data representing the traffic environment of a traveling point of the vehicle 1 after elapse of a given length of time from a current traveling point (i.e., corresponding to first environmental information). In the present embodiment the given length of time is defined as 15 seconds, for example. However, it may be set to an appropriate length of time in accordance with the speed of the vehicle 1 or an embodiment as long as it is sufficient to output a message in advance for prompting the driver to conduct a safety check.

In the present embodiment, the acquirer 403 acquires the destination environmental data from the car navigation device 11. The destination environmental data may include, as the traffic environment of a point of destination of the vehicle 1, presence or absence of road signs or pedestrians at the point concerned in addition to intersections, side roads, and parking spaces, for example. The destination environmental data further includes a course of the vehicle 1 based on the route to the final destination, for example, data representing a right turn of the vehicle 1 at a next intersection.

Conventionally, there have been proposed techniques for warning a driver if the driver fails to conduct a necessary safety check under a certain traffic environment. However, such conventional techniques cause a delay in the safety check since the driver conducts a safety check after given a warning. In view of this, the present embodiment outputs an advance message about the traffic environment concerned before entering the traffic environment in which the driver is likely to fail to conduct a safety check.

The action predictor 404 predicts a driver's action under the traffic environment of a traveling point of the vehicle 1 after elapse of the given length of time from a current traveling point as indicated by the destination environmental data acquired by the acquirer 403. Referring to the action history database 401, the action predictor 404 of the present embodiment acquires, as a predicted driver's action, the frequency of line-of-sight movement and the facial moving range that represent a previous actual action of the driver under the traffic environment indicated by the destination environmental data.

The check action acquirer 405 acquires information representing a necessary safety check action of the driver under the traffic environment of the point of the vehicle 1 after elapse of the given length of time from the current traveling point, indicated by the acquired destination environmental data by the acquirer 403. Referring to the check criteria database 402, the check action acquirer 405 of the present embodiment acquires the frequency of line-of-sight movement and the facial moving range that represent the necessary safety check action of the driver under the traffic environment indicated by the destination environmental data.

The comparer 406 compares the information (frequency of line-of-sight movement and facial moving range), which represents the necessary safety check action of the driver and is associated with the traffic environment indicated by the destination environmental data in the check criteria database 402, with the information (frequency of line-of-sight movement and facial moving range), which represents an expected action of the driver (i.e., a driver's actual action under the traffic environment) and is associated with the traffic environment indicated by the destination environmental data in the action history database 401.

As one example of specific comparison method, the comparer 406 of the present embodiment determines whether or not an expected frequency of the line-of-sight movement of the driver is higher than the frequency of line-of-sight movement being the driver's necessary safety check action. As another example, the comparer 406 determines whether or not the size of the visual field of the driver being a driver's previous actual action is larger than the size of the visual field in which the driver needs to check safety as indicated by the safety check action information.

The notifier 407 issues a notification on the basis of a result of the comparison by the comparer 406 before the vehicle travels in the traffic environment indicated by the destination environmental data. For example, when the comparer 406 determines that the expected frequency of line-of-sight movement of the driver is less or the size of the previous visual field of the driver, that is, the size of the visual field in which the driver is expected to conduct a safety check, is smaller, the notifier 407 issues an audio message to alert the driver.

For example, when the comparer 406 determines that the rightward facial moving range of the driver at the time of a right turn of the vehicle 1 is narrow, the notifier 407 outputs a message that draws the attention of the driver to the right direction before the vehicle enters the intersection where the vehicle is presumed to turn right. Thus, the message can be output before the vehicle 1 enters the intersection irrespective of whether the driver gives a right-turn signal.

The facial image input 411 receives a captured image of an area including the driver's face from the imaging device 201.

The facial data calculator 412 extracts the shapes of the faces of two or more subjects and the feature points of their facial parts including the eyes and the mouse from the received captured image, to calculate three-dimensional facial structure data including average facial shapes and the positions of the facial parts.

The model generator 413 generates, as a three-dimensional face model, the average facial shapes, the positions of the facial parts, and information on a variation in the shape of the driver's eyes, which are the three-dimensional facial structure data.

The three-dimensional face model is stored in the storage medium as the ROM 14b. The three-dimensional face model refers to a statistic facial shape model, and the three-dimensional facial shapes of average subjects, the positions of their facial parts including the eyes, the mouth, and the nose, and variation information on the eye shapes are registered. The three-dimensional face model is exemplified by constrained local model (CLM), active appearance model (AAM), and active shape model (ASM). However, it is not limited to these examples.

The action acquirer 414 continuously detects the facial position of the driver of the vehicle 1 to acquire facial motion information. The action acquirer 414 of the present embodiment acquires information representing X, Y, and Z-axial positions on the driver's face and information representing X, Y, and Z-axial rotations thereof from the three-dimensional face model generated by the model generator 413. The action acquirer 414 acquires information on the orientation of the line-of-sight of the driver on the basis of the position of the driver's face and variation information on the driver's eye shape to derive the frequency of line-of-sight movement and the facial moving range.

The history updater 415 updates the action history database 401 with the data representing the traffic environment in which the vehicle 1 is running, and the frequency of line-of-sight movement and the facial moving range acquired by the action acquirer 414 as a driver's action when the vehicle 1 is running in the traffic environment, in association with one another.

The ECU 14 of the present embodiment as configured above can accumulate the driver's actions under traffic environments in the action history database 401.

Now, steps of a message notifying process of the driving assistance system 100 in the present embodiment are described. FIG. 6 is a flowchart showing the steps of the above process of the driving assistance system 100 in the present embodiment.

The acquirer 403 acquires destination environmental data representing the traffic environment of a point of destination of the vehicle 1 from a current traveling point from the car navigation device 11 (step S601).

Then, the check action acquirer 405 acquires information on a necessary safety check action of the driver (frequency of line-of-sight movement and facial moving range) under the traffic environment of the point of destination of the vehicle 1 from the current traveling point on the basis of the destination environmental data acquired by the acquirer 403 (step S602).

The action predictor 404 acquires, on the basis of the destination environmental data acquired by the acquirer 403, information representing a driver's actual action (frequency of line-of-sight movement and facial moving range) under the same traffic environment of the point of destination of the vehicle 1 from the current traveling point (step S603).

The comparer 406 then determines whether or not the driver's actual action under the same traffic environment as that of the point of destination satisfies the requirement of the driver's necessary safety check action (step S604). When the comparer 406 determines satisfaction of the requirement (Yes in step S604), the process ends.

When the comparer 406 determines that the driver's actual action does not satisfy the requirement indicated by the information representing the driver's necessary safety check action (No in step S604), the notifier 407 issues a notification for prompting the safety check action before the vehicle 1 travels in the traffic environment indicated by the destination environmental data (step S605).

By the above processing, the driver can be alerted suitably for the destination of the vehicle 1, whereby safety improvement can be achieved.

Figure 7:
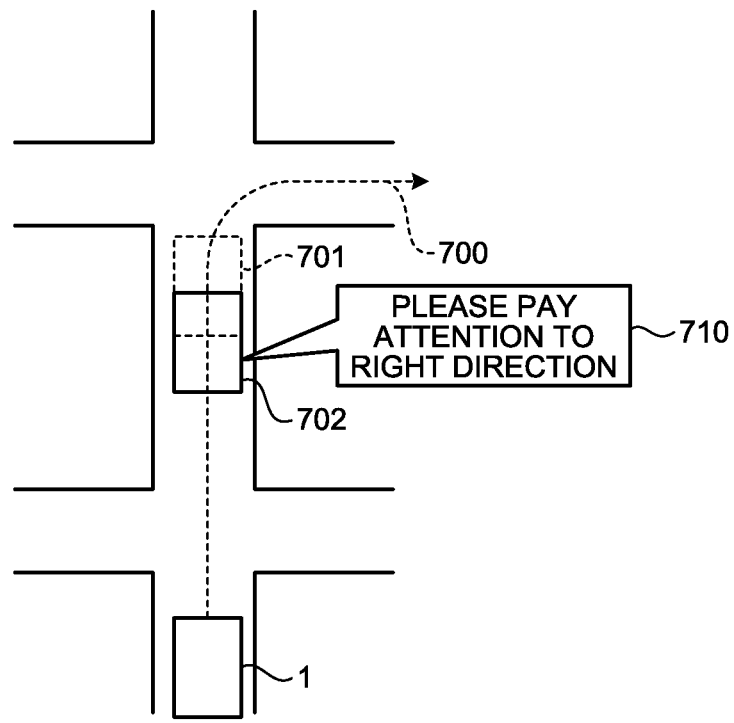
FIG. 7 illustrates a concept of notification to issue at the time of a right turn of the vehicle of the first embodiment at an intersection, by way of example.

Next, a specific situation in which a notification is issued is described. FIG. 7 illustrates a concept of notification to issue when the vehicle 1 of the present embodiment turns right at an intersection by way of example. In the example of FIG. 7, a route 700 of the vehicle 1 is designated by the car navigation device 11. When the comparer 406 determines that a driver's previous actual safety check action at the time of turning right does not satisfy the requirement, the notifier 407 outputs, to the driver, at a point 702 prior to a right-turn starting point 701, a message 710 for drawing his or her attention to right direction. The notification is issued before the driver turns the steering to the right, so that the driver can check the surroundings of the intersection before steering to the right.

The data of the driver's safety check action taken at the intersection is accumulated in the action history database 401. Thereby, a notification reflecting the driver's current action is issued at the time of next and subsequent right turns. For instance, if the driver takes safety check actions satisfying the requirement over a certain period of time, there will be no issuance of notifications. With no such safety check actions taken, notifications are issued again.

Figure 8:
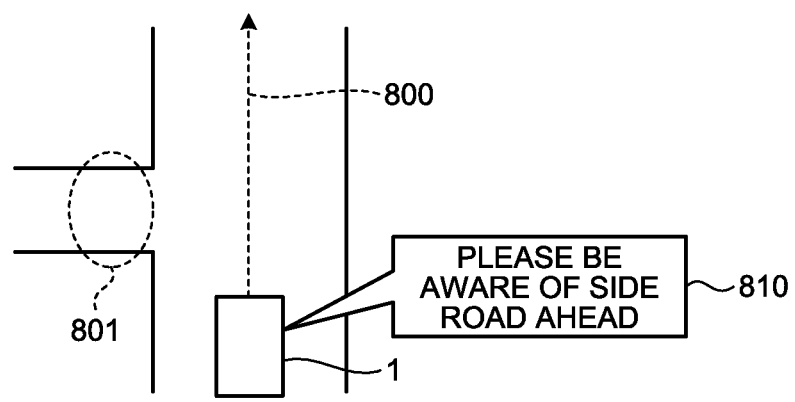
FIG. 8 illustrates a concept of notification to issue when there is a narrow side road ahead of the vehicle of the first embodiment running on the road, by way of example.

FIG. 8 illustrates a concept of notification to issue when there is a narrow side road ahead of the vehicle 1 of the present embodiment traveling on the road by way of example. In the example of FIG. 8, a route 800 of the vehicle 1 is designated by the car navigation device 11. When the comparer 406 determines that a driver's previous actual safety check action at a narrow side road does not satisfy the requirement, the notifier 407 outputs, to the driver, at a point prior to a point 801, a message for drawing his or her attention to the side road. The notification is issued before the vehicle passes the side road, which enables the driver to check a rush-out from the side road beforehand. The notification can be issued to alert the driver when needed, for example, when entering a narrow side road from a wider road or exiting from a narrow road to a wider road, in addition to when passing the side road.

Figure 9:
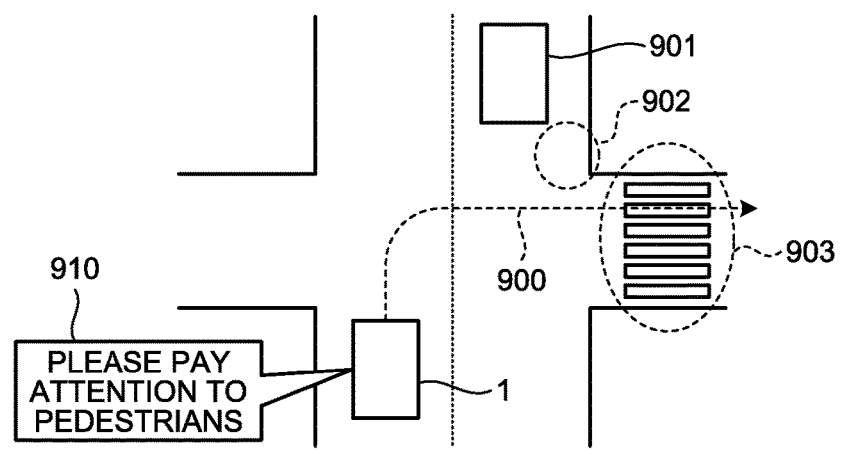
FIG. 9 illustrates a concept of notification for alerting a driver to pedestrians when the vehicle of the first embodiment turns right at an intersection with presence of an oncoming vehicle, by way of example.

FIG. 9 illustrates a concept of notification for alerting the driver to pedestrians or else when there is an oncoming vehicle when the vehicle 1 turns right at the intersection, by way of example. In the example of FIG. 9, a route 900 of the vehicle 1 is designated by the car navigation device 11. This exemplifies an alert for the driver to avoid rush-out of a pedestrian when turning right and entering a rightward road, after completing a surrounding check at the right turn. For example, when the comparer 406 determines that a previous safety check action to a shadow 902 of an oncoming vehicle 901 or a crosswalk 903 at a right turn does not satisfy the requirement, the notifier 407 outputs, to the driver, at a point before passing the oncoming vehicle 901, a message 910 for drawing his or her attention to pedestrians. The notification is issued before the vehicle 1 passes the oncoming vehicle, which enables the driver to check in advance the shadow 902 of the oncoming vehicle 901 or if there is a rush-out from the crosswalk 903. Although FIG. 9 illustrates an example of the situation at the time of a right turn, the notification can be issued at the time of a left turn to draw the driver's attention to pedestrians in order not to hit a pedestrian.

The example of issuing a notification based on the route designated by the car navigation device 11 has been described above. However, the present embodiment is not limited to the notification based on the route designated by the car navigation device 11. The present embodiment may be adopted for any pre-notification technique concerning traffic environment. Thus, a situation that the distance meters 17 have detected a parked car is now described. FIG. 10 illustrates a concept of notification for alert when the distance meters 17 of the vehicle 1 of the present embodiment have detected a parked car, by way of example.

FIG. 10(A) shows that a parked vehicle 1001 is present in the traveling direction of the vehicle 1 and the vehicle runs following a route 1000, by way of example. In such a case, it is assumed that a driver's safety check action to a shadow of the parked vehicle 1001, acquired by the action acquirer 414, fails to satisfy a pre-defined requirement In such a case the history updater 415 updates the action history database 401 with data reflecting the non-satisfaction of the requirement.

Then, the distance meters 17 detect a parked vehicle 1011 in the traveling direction of the vehicle 1, as illustrated in FIG. 10(B). In such a case, the notifier 407 outputs a message 1020 for drawing the driver's attention to the periphery of the vehicle on the basis of a result of learning the situation in FIG. 10(A), even if the vehicle 1 is sufficiently away from the parked vehicle 1011. Thus, the notification that draws the driver's attention to the periphery of the vehicle 1011 is issued before the vehicle 1 comes close to the parked vehicle 1011. This enables the driver to check the periphery of the parked vehicle 1011 before controlling the steering to avoid the parked vehicle 1011, following a route 1010. Thereby, safety improvement can be achieved. The information on the safety check conducted in FIG. 10(B) is also stored in the action history database 401.

Thus, if the driver properly conducts a safety check in the situation shown in FIG. 10(B), the notifier 407 refrains from issuing the notification for alerting the driver to the periphery of the vehicle in next and subsequent occasions. This can prevent issuance of unnecessary notifications to the driver.

In the example of FIG. 10, the situation that the parked vehicle 1011 is present is described. However, the issuance of the notification based on the distance meters 17 is not limited to such a situation and can be applied to a safety check at a junction, for example. Moreover, an imaging camera can be used to identify a road sign such as "STOP" drawn on the road and a notification may be issued to prompt the driver to conduct a proper safety check to deal with the road sign.

Figure 11:
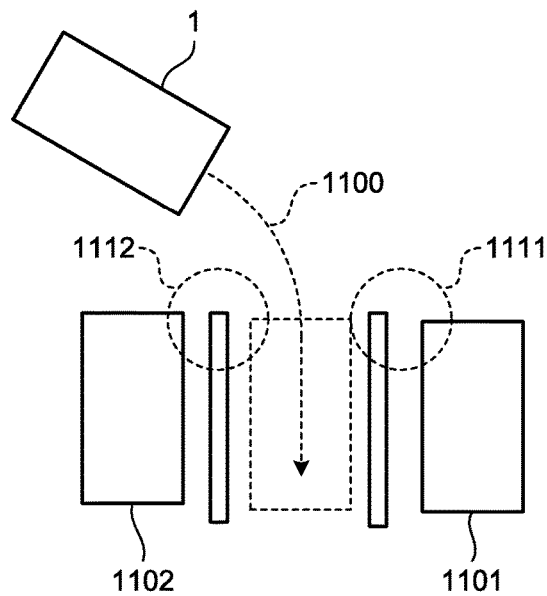
FIG. 11 illustrates a situation that the vehicle of the first embodiment is moving backward for parking in a parking space, by way of example.

The notification can be issued on the basis of the steering of the vehicle 1. FIG. 11 illustrates the vehicle 1 of the present embodiment when moving rearward for parking in a parking space, by way of example. In the example of FIG. 11, when the driving assistance system 100 detects switching of the steering to a rearward moving in a traveling direction 1100, the comparer 406 determines whether or not a driver's previous safety check action to regions similar to regions 1111, 1112 and obstacles 1101, 1102 at the time of parking the vehicle in a parking space satisfies a pre-defined requirement, referring to the history database 401. The notifier 407 issues a notification based on a result of the determination before the vehicle 1 starts moving backward. This enables the driver to conduct a safety check prior to driving backward.

Figure 12:
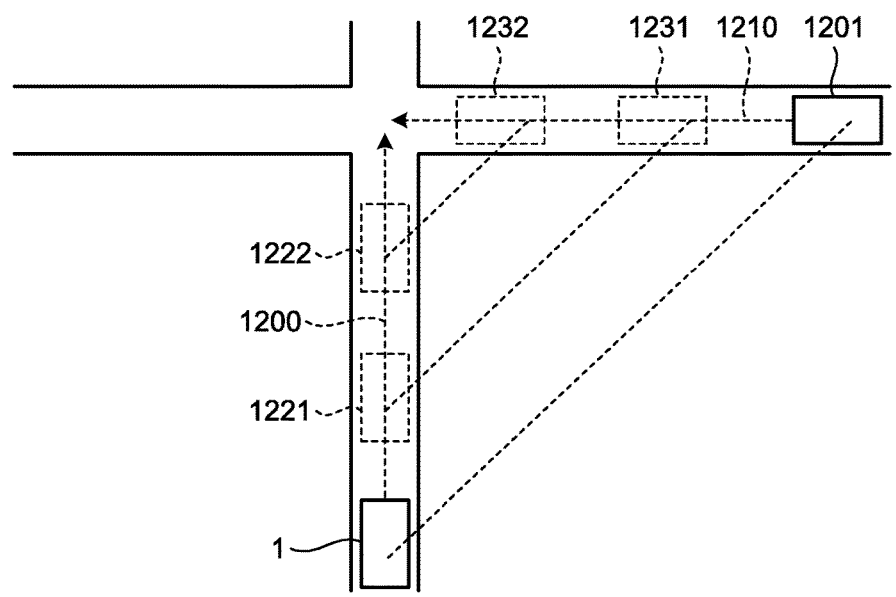
FIG. 12 illustrates a situation that the vehicle of the first embodiment is running at an intersection with a good view, by way of example.

Moreover, the location where the notification is issued is not limited to the location where the driver has difficulty in checking safety, and it may be issued in a location with a good view. FIG. 12 illustrates the vehicle 1 running at an intersection with a good view. In the example of FIG. 12, the vehicle 1 and a vehicle 1201 are running at the intersection with a good view. The intersection shown in FIG. 12 is defined as a farm road with a good view and no traffic lights. In such a situation the vehicle 1201 enters the visual field of the driver of the vehicle 1.

In the example of FIG. 12, while the vehicle 1 passes a position 1221 and a position 1222, following a route 1200, the vehicle 1201 passes a position 1231 and a position 1232, following a route 1210.

Meanwhile, a phenomenon occurs that the human eyes cannot recognize an object if it continuously remains in the same position in the visual field. In the example of FIG. 12, the vehicle 1201 stays relatively in the same position, as viewed from the vehicle 1. In such a case the phenomenon arises that the driver cannot recognize the vehicle 1201 despite the fact that the vehicle 1201 is in the sight of the driver. In such a case the driver can recognize the vehicle 1201 by moving his or her head to slightly shift the relative position.

In view of this, in the present embodiment, upon recognition of an intersection with a good view on a travel route of the vehicle 1 on the basis of the destination environmental data from the car navigation device 11, when the comparer 406 determines that the driver did not move his or her head and look around under such a traffic environment in the past, the notifier 407 issues a notification that prompts the driver to move his or her head and look around. Such a notification is issued at the position 1221, for example. Following the notification, the driver conducts a safety check to be able to recognize the vehicle 1. This can achieve safety improvement at the intersection with a good view.

Figure 13:
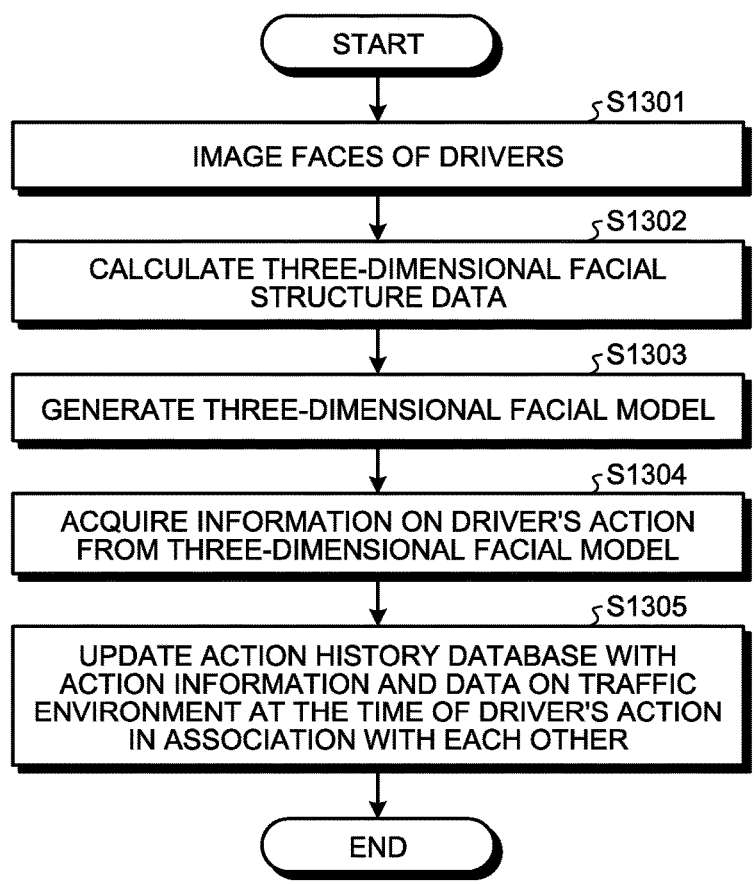
FIG. 13 is a flowchart showing steps of an action history database update process of the driving assistance system according to the first embodiment.

Next, an update process to the action history database 401 is described. FIG. 13 is a flowchart showing steps of the update process to the action history database in the driving assistance system 100 of the present embodiment.

First, the facial image input 411 acquires captured image data of the faces of drivers (step S1301). Next, the facial data calculator 412 extracts the facial shapes of two or more subjects and the feature points of their facial parts including the eyes and the mouth from the captured image data to calculate three-dimensional facial structure data such as average facial shapes and the positions of the facial parts (step S1302).

The facial data calculator 412 extracts shape parameters corresponding to the state of a gradual change in the eye shapes from captured images of variously changing motions of the subjects obtained in step S1301 by a statistic data analysis method such as principal component analysis, following the three-dimensional face model generation procedure disclosed in a non-patent literature, "Automated Individualization of Eye Region Model using Active Appearance Model Search" by Tsuyoshi MORIYAMA, Takeo KANADE, Jeffrey F. COHN, and Shinji OZAWA, Image Recognition and Understanding Symposium (MIRU2006).

The facial data calculator 412 generates variation information representing the state of a gradual change in the eye shape and a shape parameter. The orientation of the line of sight of the driver can be specified from the variation information and the position of the driver's face.

The model generator 413 generates the calculated three-dimensional facial structure data, that is, the average facial shapes, the positions of facial parts, and the variation information as a three-dimensional face model (S1303).

The action acquirer 414 then acquires information on a driver's action from the three-dimensional face model (step S1304). The information on a driver's action is assumed to be continuously acquired while the driver drives the vehicle.

The history updater 415 updates the action history database 401 with the information on a driver's action acquired in step S1304 and the traffic environmental data at the time of the driver's action, in association with each other (step S1305).

By the above procedure, driver's actions taken under traffic environments are accumulated.

Second Embodiment

The first embodiment has described the example of acquiring the destination environmental data representing the traffic environment of the destination of the vehicle 1 from the car navigation device 11. However, the above embodiment is not intended to be limited to such an acquisition method. A second embodiment will describe an example of estimation based on the driving state of a driver.

Figure 14:
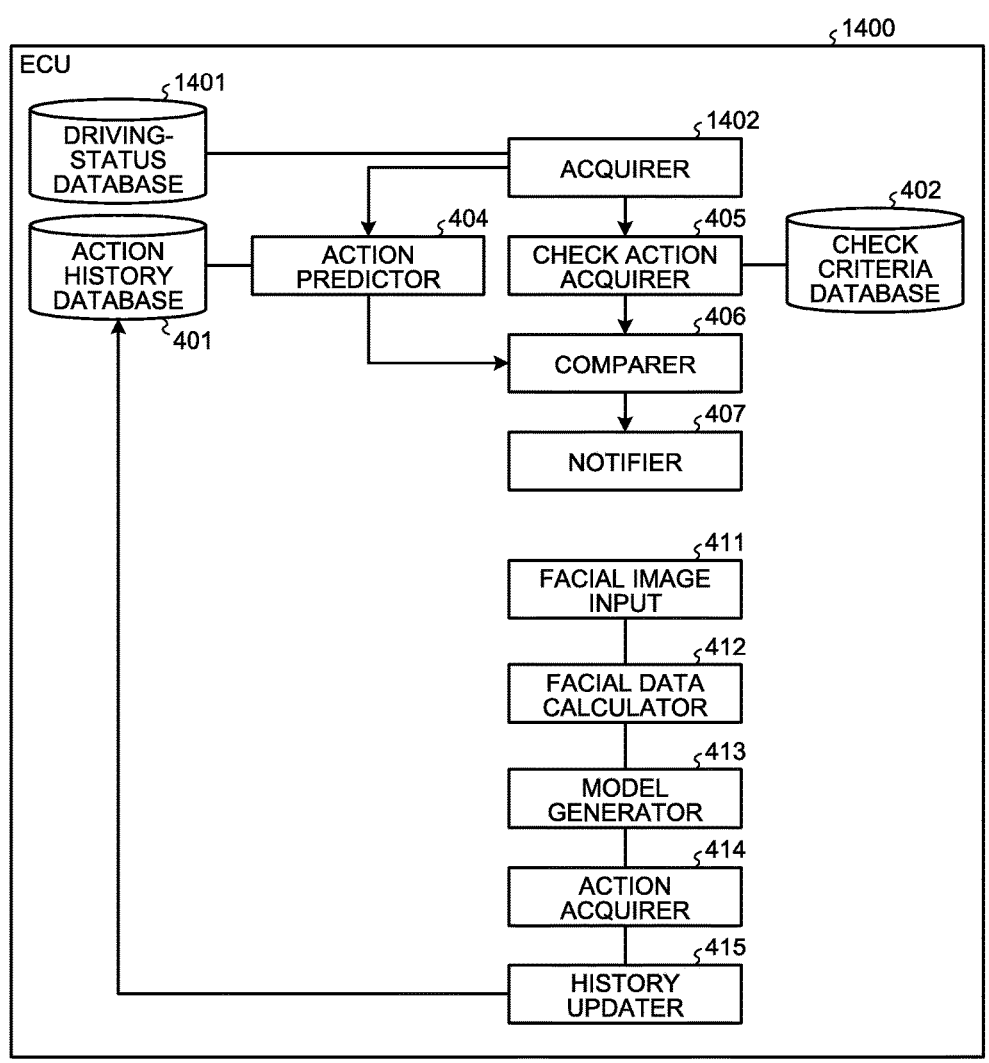
FIG. 14 is a block diagram of a functional configuration of an ECU according to a second embodiment.

FIG. 14 is a block diagram illustrating the functional configuration of an ECU 1400 of the present embodiment. The ECU 1400 shown in FIG. 14 is provided in place of the ECU 14 of the first embodiment and additionally includes an acquirer 1402 that differently operates from the acquirer 403 of the first embodiment, and a driving-status database 1401.

The driving-status database 1401 (driving-status storage) stores driving-status information representing a driving state of the driver of the vehicle 1 and information on the traffic environment when the driver is driving in the driving state concerned, in association with each other. In other words, referring to the driving-status database 1401, a current traffic environment and the traffic environment of a destination can be estimated from a current driving state.

The driving-status database 1401 contains, for example, information indicating that the vehicle 1 is likely to turn right at an intersection if the vehicle runs at a first speed at a given point prior to the intersection.

The acquirer 1402 estimates how the vehicle 1 runs under the traffic environment of the destination on the basis of the current driving state, referring to the driving-status database 1401. For example, the acquirer 1402 estimates a right turn of the vehicle 1 at the intersection if the vehicle 1 runs at the first speed at the given point prior to the intersection. Thus, with no route to the final destination set to the car navigation device 11, the ECU 1400 can estimate the destination of the vehicle 1 and the traffic environment of the destination of the vehicle 1 on the basis of the driving state of the vehicle 1.

Thus, according to the ECU 1400 of the present embodiment, for example, the acquirer 1402 estimates a right turn of the vehicle 1 at a next intersection, the comparer 406 compares whether or not the previous safety check action of the driver of the vehicle 1 at the time of turning right at an intersection satisfies the requirement, and the notifier 407 can issue a notification based on the result of the comparison.

The present embodiment is not limited to such traveling-route estimation based on the previous driving state of the driver. For example, when the vehicle 1 is on a frequently taken route, the acquirer 1402 may estimate, without a set traveling route to the final destination, the traffic environment in which the vehicle 1 will travel, on the premise that the vehicle 1 travels along the frequently taken route. When the vehicle 1 is activated in weekday morning, for example, the acquirer 1402 may acquire traffic environmental information, on the premise that the vehicle runs along a traveling route to a place of work.

The above embodiment has described an advance notification based on a certain traffic environment before the vehicle 1 enters the traffic environment. The notification can work for prompting a safety check for the traffic environment. By the notification, the driver can conduct a safety check in advance. Thereby, safety improvement can be attained.

While certain embodiments have been described, the embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A driving assistance device comprising:
   an acquirer that acquires first environmental information representing an environment of a traveling point of a vehicle after elapse of a given length of time from a current traveling point of the vehicle;
   a check information storage that stores second environmental information and check action information in association with each other, the second environmental information representing an environment of a point at which the vehicle has traveled, the check action information representing a necessary action of a driver under the environment indicated by the second environmental information;
   an action information storage that stores third environmental information and actual action information in association with each other, the actual action information representing an actual action of the driver under the environment indicated by the third environmental information;
   a comparer that compares the check action information, which is associated with the second environmental information that is stored in the check information storage and that is of the environment indicated by the first environmental information, with the actual action information, which is associated with the third environmental information that is stored in the action information storage and that is of the environment indicated by the first environmental information; and
   a notifier that issues a notification on the basis of a result of the comparison by the comparer before the vehicle travels in the environment indicated by the first environmental information.

2. The driving assistance device according to claim 1, further comprising:
   an action acquirer that acquires action information representing an action of the driver of the vehicle; and
   an updater that updates the action information storage with the third environmental information and the action information in association with each other, the action information acquired by the acquirer as the action of the driver when the vehicle travels in the environment indicated by the third environmental information.

3. The driving assistance device according to claim 1, wherein
   the acquirer acquires the first environmental information from a vehicle guidance device that derives a route of the vehicle to a destination on the basis of map information.

4. The driving assistance device according to claim 1, further comprising
   a driving-status storage that stores the third environmental information and driving-status information in association with each other, the driving-status information representing a driving state of the driver when traveling under an environment of a point indicated by the third environmental information, wherein
   the acquirer acquires the first environmental information as an estimated traveling direction of the vehicle on the basis of the third environmental information which is associated with the driving-status information representing a current driving state of the driver in the driving-status storage.

5. The driving assistance device according to claim 1, wherein
   the comparer determines whether or not a size of a visual field of the driver, indicated by the actual action information as the actual action of the driver, is larger than a size of the visual field of the driver, indicated by the check action information, in which the driver needs to conduct a check; and
   the notifier issues a notification when being determined that the size of the visual field of the driver indicated by the actual action information is not larger than the size of the visual field, indicated by the check action information, in which the driver needs to conduct a check.

* * * * *